United States Patent [19]

Buschhoff et al.

[11] Patent Number: 4,545,708

[45] Date of Patent: Oct. 8, 1985

[54] METHOD FOR PRODUCING CROWNED TOOTH FLANKS ON A TOOTHED WORKPIECE, AND A MACHINE SUITED THEREFOR

[75] Inventors: Karl Buschhoff; Heinrich Fischer, both of Munich, Fed. Rep. of Germany

[73] Assignee: Carl Hurth Maschinen- und Zahnradfabrik GmbH & Co., Munich, Fed. Rep. of Germany

[21] Appl. No.: 423,493

[22] Filed: Sep. 24, 1982

[30] Foreign Application Priority Data

Oct. 29, 1981 [DE] Fed. Rep. of Germany ....... 3142843
Mar. 5, 1982 [DE] Fed. Rep. of Germany ....... 3207924

[51] Int. Cl.$^4$ .............................................. B23F 19/06
[52] U.S. Cl. ...................................... 409/49; 51/52 R; 409/32; 409/33; 409/37
[58] Field of Search .................... 409/2, 3, 31, 32, 33, 409/34, 36, 37, 42, 49; 51/32, 52 R; 29/159.2

[56] References Cited

U.S. PATENT DOCUMENTS

| | | | |
|---|---|---|---|
| 2,762,268 | 9/1956 | Maurer | 409/33 |
| 3,160,065 | 12/1964 | Rogg | 409/33 |
| 3,188,915 | 6/1965 | Hurth | 409/33 |
| 3,272,075 | 9/1966 | Gates et al. | 409/32 |
| 4,359,301 | 11/1982 | Spensberger et al. | 409/49 |
| 4,502,822 | 3/1985 | Fischer | 409/33 |

FOREIGN PATENT DOCUMENTS 2912545 10/1980 Fed. Rep. of Germany .

*Primary Examiner*—Gil Weidenfeld
*Assistant Examiner*—Daniel W. Howell
*Attorney, Agent, or Firm*—Flynn, Thiel, Boutell & Tanis

[57] ABSTRACT

A method and an apparatus for shaving, rolling or similar ones of the tooth flanks of gears in which a gearlike workpiece which is to be worked is supported stationarily, however, rotatingly and is in a two flank meshing engagement with a toothlike tool. The tool carries out a rectilinear back-and-forth feed movement in a plane, which is parallel with respect to the workpiece axis, a plunge movement perpendicularly with respect to the workpiece axis and a swivelling movement about an axis which is directed transversely with respect to the feed direction. To produce crowned tooth flanks, the plunge feed and the swivelling movement of the tool is changed independently from one another in dependency of the respective position of the tool along the feed path. A rocking device is provided on which is arranged the tool and which also takes part in the back-and-forth feed movement and which furthermore can be driven pivotally about an axis which extends transversely with respect to the feed direction. Feed, plunge and swivelling movements are controlled corresponding with the pregiven flank line of the workpiece.

An adjusting device is connected to the rocking device through a coupling member which is capable of accommodating a swivelling movement. The adjusting device includes a motor which drives a spindle, wherein the spindle cooperates with a spindle nut, to which is hingedly connected a coupling member which, in turn, is connected to the rocking device.

11 Claims, 5 Drawing Figures

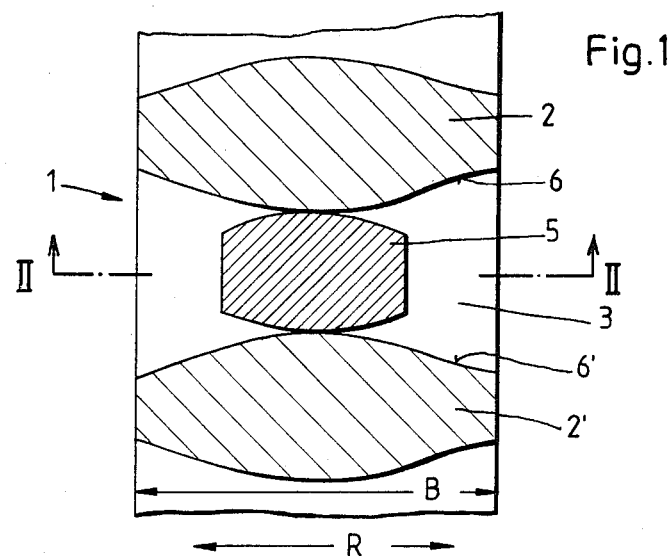
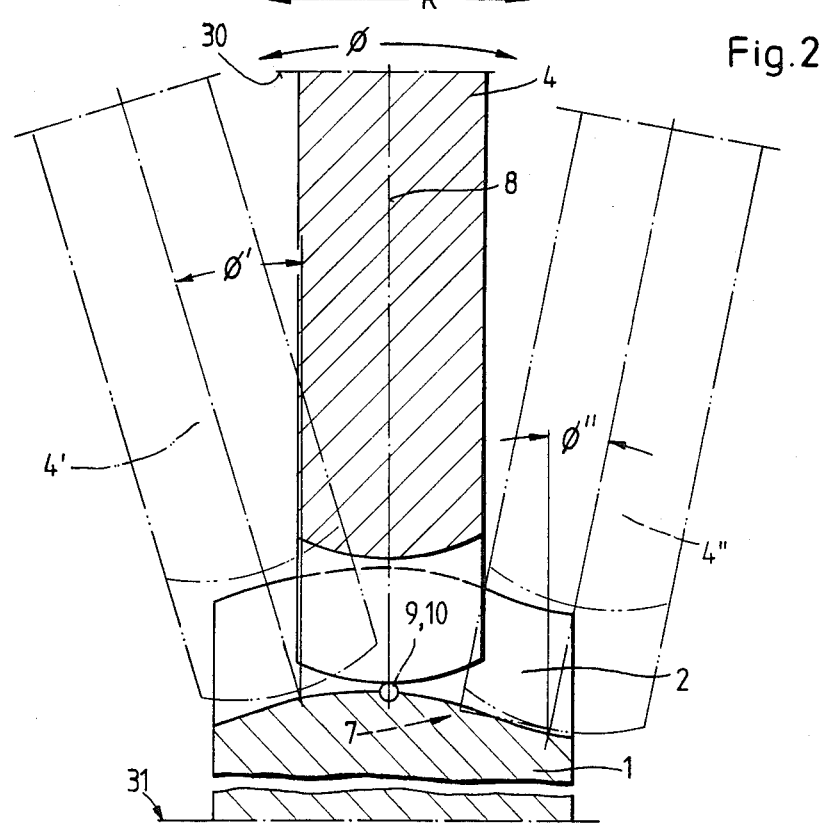

Fig. 3
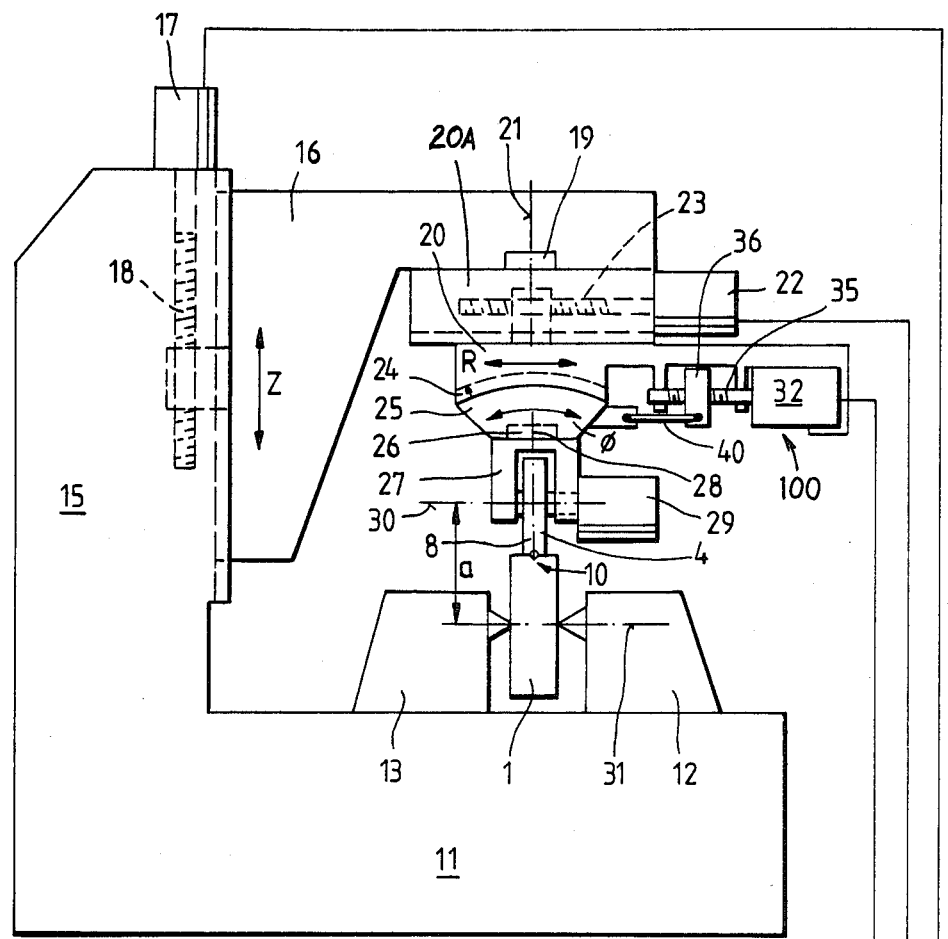
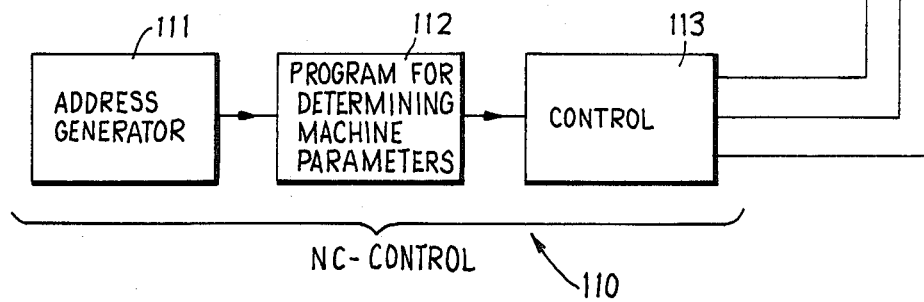

METHOD FOR PRODUCING CROWNED TOOTH FLANKS ON A TOOTHED WORKPIECE, AND A MACHINE SUITED THEREFOR

FIELD OF THE INVENTION

The invention relates to a method for producing crowned tooth flanks on a workpiece and a machine for carrying out the method.

BACKGROUND OF THE INVENTION

In conventional machines for the precision working of the tooth flanks of toothed workpieces according to the mentioned method, a swivelling movement of the tool or the workpiece is coupled with a center distance change for producing a crown dimension. For example, in the gear shaving machine according to German OS No. 29 27 976 (corresponds to U.S. application Ser. No. 467,425, filed Feb. 17, 1983, which is a continuation of application Ser. No. 129,789, filed Mar. 12, 1980, now abandoned), a feed carriage which has the tool thereon is suspended tiltably about a transverse axis and is supported at one end through a guide bar in a rocker arm. If the guide bar is positioned horizontally, it slides in the rocker arm without influencing the feed carriage. If the guide bar, however, is inclined, the feed carriage tilts up and down during the back-and-forth feed movement, so that the shaving gear removes more material at the two opposite tooth ends of the workpiece than in the center, namely, crowned teeth are produced. The magnitude or size of the crown dimension can be changed simply by adjusting the angle of inclination of the guide bar. The extent of the crown dimension (convexity) is determined by the construction of the mentioned devices.

Deviations from the predetermined extent of the crown dimension are only possible with a differently formed, for example curved guide bar. The development and the manufacture of such curved guide bars, however, is very time consuming and thus expensive. A freely selectable crown dimension is in spite of this not achievable.

Therefore, the basic purpose of the invention is to provide a method and a machine which is suited therefor, with which it is possible to be able to choose in as free as possible a manner the size and form of the crown dimension.

In the inventive method, each point on the respective flank line has associated with it a specified center distance and a specified angle of traverse and a specified plunge angle, each of which is selected to correspond with the requirements, for example, of a desired form of the flank line. The tool follows then the desired form of the flank line, which must not only be formed convexly—as it was only possible up to now—but can also have straight and even concave sections. In order for the produced flank line to correspond as much as possible exactly with the desired one, the tool is always to be oriented so that the plane of rotation thereof extends perpendicularly with respect to the respective section of the flank line. For this reason, the axis for the swivelling movement of the rocking device extends at least approximately through the angle forming summit or midpoint of the center plane of rotation of the tool, which angle opens toward the workpiece.

With the suggested method and the machine suited therefor, crowned tooth flanks can be produced primarily by shaving; the method and the machine, however, are also suited for different precision working methods with two flank meshing engagement, as for example, rolling, honing, etc. The machine in addition offers thereby the advantage that the radial working forces can be absorbed directly by a large-surface guide of the rocking device and only the axial forces must be absorbed by the structural parts which are necessary for the rotary adjustment of the tool head. The arrangement of a rocking device for the inclined positioning of a shaving gear is known from German OS No. 29 12 545. The inclined positioning of the tool, however, does here not occur during the working operation and serves to balance a tilted condition of the workpiece tooth system, such as when the workpiece elastically deforms due to the working pressure applied thereto.

The swivelling movement could be produced with a motor which is arranged on the feed carriage and which drives the rocking device through a worm gear. However, adjustable clearance-free worm drives are, as known, very expensive to make. Aside from this they have, due to the strong friction forces, a poor efficiency and are subject to a quick wear. To transmit the very small swivelling movements which are to be carried out at very specific preselectable points of the feed movement, in the type of machine that is being discussed here, a worm drive is therefore not particularly well suited.

For this reason the machine is provided with an adjusting device for the swivelling drive of the rocking device in the feed carriage. The adjusting device is connected to the rocking device through at least one coupling member and this coupling member is respectively these coupling members are hingedly connected at one end to a rectilinearly adjustable member of the adjusting device and at the other end to the rocking device.

As rectilinearly acting adjusting device, a hydraulic cylinder, having a piston guided therein and a piston rod which is secured thereon and exits from the cylinder, can be utilized when the piston rod is hingedly connected to a coupling member. A more sensitive adjusting of the rocking device is achieved utilizing a threaded spindle and a spindle nut threadedly engaged therewith. The spindle is driven for rotation and is supported in the feed carriage. The spindle nut is connected to the rocking member through the at least one coupling member.

For connecting the coupling member respectively the coupling members to the rocking member and to the spindle nut preferably clearance-free adjustable joints are provided. Especially clearance-free adjustable ball-and-socket joints are very advantageous.

With such a device, the swivelling movement can be transmitted easily and clearance-free. If after a longer operation a clearance begins to occur due to wear, the spindle and the spindle nut, just as with the joints, can be easily readjusted. The coupling member may be a simple coupling rod or a cup or sleeve which partially or entirely surrounds the adjusting mechanism. Of course, two coupling rods which are arranged parallel to one another are also possible. The deviation of the angle of traverse from the path of the rectilinearly adjustable member, which deviation is caused by the change of the inclination of the coupling member relative to the axis defined by the movement of the rectilinearly adjustable member, is negligibly small, if axis and coupling member are arranged approximately tangentially with respect to the circularly shaped guide for the rocking device. "Approximately tangentially" is thereby to be understood as including "parallel to a tangent". In a different arrangement, uneven angles of traverse are achieved by corresponding paths of the rectilinearly adjustable member in the one or in the other direction. The drive for the swivelling movement is explained above and cannot only be manufactured and mounted simply and inexpensively, but operates also clearance-free with low friction and substantially wear-free.

BRIEF DESCRIPTION OF THE DRAWINGS

The invention will be described hereinafter with reference to an exemplary embodiment which is illustrated in five figures. More specifically, FIG. 1 is a cross-sectional view of two adjacent teeth of a gear taken along their corresponding horizontal flank lines;

FIG. 2 is a cross-sectional view taken along the line II—II and illustrates the tool in various positions;

FIG. 3 schematically illustrates a machine according to the invention;

DETAILED DESCRIPTION

Figure 4:
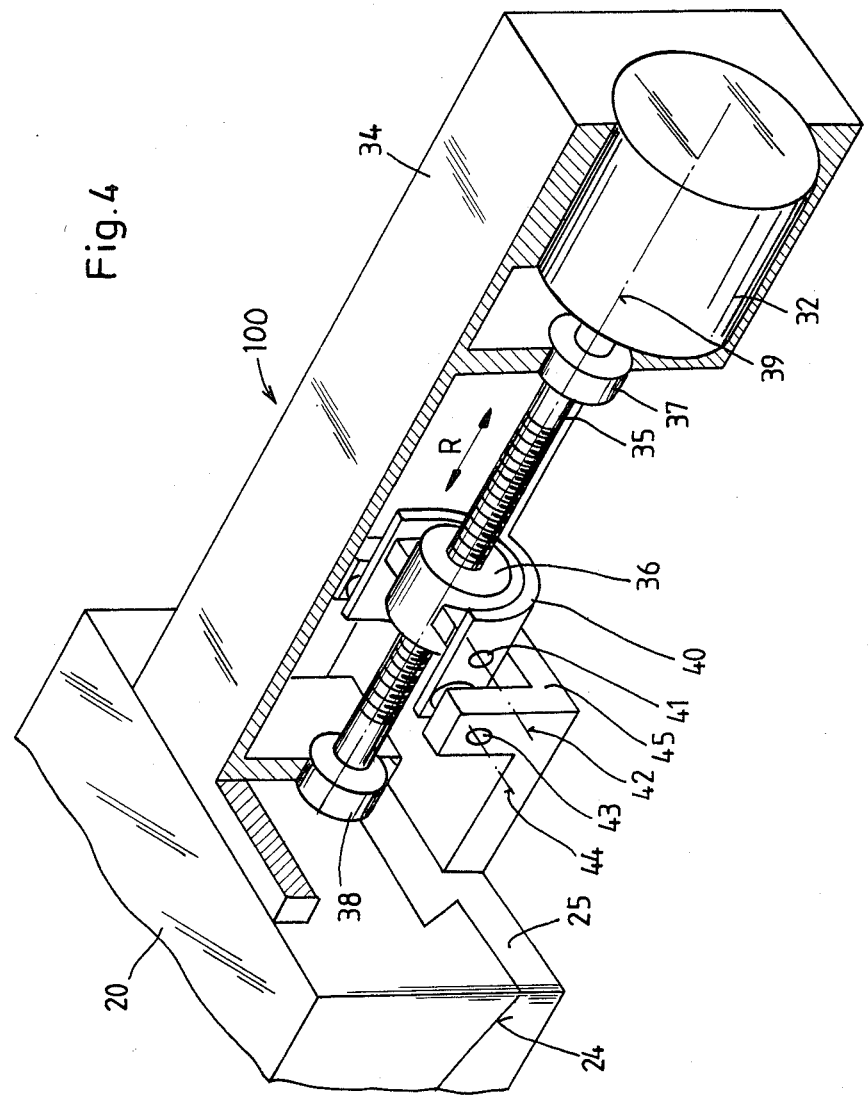
FIG. 4 illustrates through a perspective illustration one example of a pivot drive.

FIGS. 1 and 2 illustrate in cross section mutually adjacent teeth 2,2' of a gearlike workpiece 1 which is to be worked. A tooth 5 of a tool 4, which may be a shaving gear or a different suitable tool, extends into the gap 3 between the teeth 2,2'. The tool carries out a back-and-forth feed movement (in the direction of the arrow R). In order for the two flank meshing engagement to be maintained over the entire face width B or in order to obtain the desired flank lines 6,6', the tool 4 must carry out a swivelling movement (in the direction of the arrow $\phi$) during the course of the feed movement, which swivelling movement is associated with a change of the center distance a. In FIG. 2, the tool 4 is identified on the left in a correspondingly swivelled position $\phi'$ by the reference numeral 4'. On the right, where the crown dimension decreases again toward the face, the initially stronger swivelling is again reduced by opposite swivelling of the tool 4. In a position during the opposite swivelling movement, swivelled position $\phi''$, the tool is identified here by the reference numeral 4'''. In particular for such workpieces with a crown dimension which is again reduced toward the faces of the workpiece, the use of tools with crowned teeth is advisable. Otherwise the edge 7 (FIG. 2) of the tool tooth would cause damage to the workpiece teeth or would also be damaged itself. For the same reason, it is preferable that the center plane of rotation 8 of the tool 4 at the respective contact point 9 is always positioned perpendicularly with respect to the flank line. The axis 10 for the swivelling movement $\phi$ therefore extends through the angle forming summit or midpoint of the center plane of rotation 8, which angle opens toward the workpiece 1.

FIG. 3 illustrates a gear-shaving machine, as an example of a machine, with which the relationships which have been described above with reference to FIGS. 1 and 2 between the tool 4 and the workpiece 1 are achieved. The workpiece 1 is received on the bed or base 11 between a pair of tailstocks 12,13. A vertically elevatable carriage 16 is movable (in the direction of the arrow Z) on an upstanding column 15 at one end of the base 11 and is vertically drivable by a motor 17 and a conventional spindle and travelling nut arrangement 18. The direction of the arrow Z and, therefore, the direction of the carriage 16 is perpendicular to the axis 31 of the workpiece. Thus, the center distance a is varied during a machining operation. The carriage 16 will, therefore, hereinafter be referred to as a plunge carriage. A feed carriage 20 is adjustably mounted for movement about an upright vertical axis 21 in a rotary clamping mechanism 19. The feed carriage 20 is movable back and forth relative to a guide carrier 20A on the vertically elevatable plunge carriage 16, for which a motor 22 and a spindle and travelling nut arrangement 23 are provided. A rocking device or support 25 is arranged in an arcuate guide 24 on the underside of the feed carriage 20. A rotary clamping mechanism 26 is mounted on the rocking device 25. A tool head 27 is adjustably rotatably mounted for movement about a vertical axis 28 on the clamping mechanism 26. A shaving gear (tool 4) is rotatably supported on the tool head 27 and driven for rotation by a motor 29 also provided on the tool head 27. The axes 21 and 28 are in alignment and lie in the center plane of rotation 8 of the shaving gear 4.

By rotating the tool head 27 about the axis 28, a crossed-axes angle between the axis of rotation 30 of the shaving gear 4 and the axis of rotation 31 of the workpiece 1 is adjusted. The axes 30 and 31 lie thereby in horizontal planes which are parallel to one another. By rotating the feed carriage 20 about the axis 21, the feed direction of the shaving gear 4 is adjusted, particularly if shaving is not to take place in the parallel method (i.e. a feed direction R which lies in the plane of the drawing of FIG. 3) but is, instead, to take place according to the diagonal method (i.e. a feed direction R which is inclined with respect to the plane of the drawing for FIG. 3).

The rocking device 25 with the tool head 27 and the shaving gear 4 thereon are pivotal about the axis 10 in the arcuate guide 24. An adjusting device, which will be discussed in greater detail below, is provided for the swivelling movement $\phi$.

In order for the shaving gear 4 to be able to follow the desired shape of the flank line, a specific center distance a (FIG. 3) and a specific plunge angle $\phi',\phi''$ (FIG. 2) are associated with each point along the flank line. The movements of the shaving gear 4 are determined in the simplest manner with reference to the path which is to be described from a point on the outside diameter thereof and stored in a machine control 110, here a NC-control having an appropriate program developed from the requisite machine parameters. An adjustment of the movement in the Z direction and in dependency of the movement in the R direction occurs through the NC-control.

The NC-control 110 may be any conventional type of NC device. In the preferred embodiment, as illustrated in FIG. 3, the NC-control 110 includes an address generator 111, a read-only memory (ROM) 112 containing a preprogrammed sequence of parameters for controlling the motors 17,22 and 32 of the machine, and a control circuit 113. The address generator 111 is preferably a conventional binary up counter which is periodically incremented. The binary output of the counter is applied to the address inputs of the ROM, the locations of the ROM thereby being sequentially read out as the address counter is incremented. Each word of the ROM 112 is preferably a word of several binary digits (bits) which is divided into three groups or fields of several bits each, each field corresponding to a respective one of the controlled motors and containing one bit which indicates the direction the associated motor is to be rotated and several bits which indicate how far the motor shaft is to be rotated in the selected direction in order to effect all or part of the requisite linear movement of the associated component of the machine. The control circuit 113 includes three conventional and substantially identical circuits which are not illustrated, each converting the binary number from a respective field of the ROM into the appropriate electrical control signals for the associated motor.

In a typical operational sequence, the carriage 16 will be maintained at a given vertical height while the feed carriage 20 is moved leftwardly in FIG. 3 and the rocking device 25 is simultaneously moved counterclockwise, so that the tool moves from the position 4" (FIG. 2) to the position 4'. The plunge carriage 16 will then be lowered slightly and then held at this vertical position while the feed carriage 20 is moved rightwardly and the rocking device 25 is simultaneously rotated clockwise so that the tool moves from the position 4' to the position 4". The plunge carriage 16 is then moved downwardly again a small distance. This sequence is repeated a number of times, after which the carriage 16 is moved continuously upwardly to its original position.

This sequence can be implemented with the control device 110 in the following manner. A large number of words would be read sequentially from the ROM 112 as the address generator supplies consecutive addresses thereto. The field controlling the motor 17 would, in the first several words, indicate that the motor 17 is not to be operated, thereby maintaining the plunge carriage 16 at a given vertical height. The other two fields in the same words would, however, cause sequential rotational operations of each of the motors 22 and 32 so as to simultaneously move the feed carriage 20 leftwardly and the rocking device 25 counterclockwise, as described above. The next sequential word or words read from the ROM would cause the motor 17 to rotate slightly so as to move the plunge carriage 16 downwardly a short distance. Several words would then be read sequentially from the ROM 112 which would each indicate that the motor 17 is not to be actuated, but would cause the motors 22 and 32 to move the feed carriage 20 rightwardly and the rocking device 25 clockwise in successive and preferably almost continuous steps. The next word or words read from the ROM 112 would cause the motor 17 to be rotated slightly so as to again move the carriage 16 downwardly a small distance. Successive words read from the ROM thereafter would cause this cycle to repeat several times, and a final sequence of words read from the ROM 112 would cause the motor 17 to rotate in the opposite direction a number of times in order to move the plunge carriage 16 upwardly to its original position.

The already mentioned adjusting device 100 for effecting the swivelling movement $\phi$ is illustrated in FIG. 4. The adjusting device 100 consists substantially of a motor 32 mounted on an arm 34 of the feed carriage 20, a rotatably supported but axially fixed threaded spindle 35 rotatingly driven by the motor 32. The spindle 35 is rotatably supported in bearings 37,38 in the arm. A spindle nut 36 is provided and receives clearance-free therethrough the threaded spindle 35. The term "clearance-free" is intended to mean that the nut 36 will be unable to travel along the length of the spindle 35 when the spindle is not rotating. The motor may be a hydraulic motor, a three-phase current motor or a d.c. servomotor. A reduction gear can, if desired, be provided between the motor 32 and the spindle 35. The longitudinal axis of rotation 39 of the spindle 35 extends tangentially with respect to the arcuate guide 24. The axis 39 may also be directed parallel with respect to a tangent of the arcuate guide 24. There is arranged laterally on the spindle nut 36 a U-shaped coupling member 40 by means of clearance-free adjustable joints 41, the axis 42 of which joints extends parallel with respect to the swivel axis 10 of the rocking device 25. The term "clearance-free" is intended to mean that the axis 39 cannot move relative to the U-shaped coupling member 40. The coupling member 40 is, in addition, hingedly connected to a bifurated or forked member 45 which is a part of the rocking device 25 by means of clearance-free adjustable joints 43, the axis 44 of which also extends parallel with respect to the swivel axis 10. The term "clearance-free" is intended to mean that the axis 44 cannot move relative to the forked member 45.

If the spindle 35 is now driven by the motor 32, then the spindle nut 36 is moved to the left or to the right depending on the direction of rotation of the spindle 35. The rocking device 25 and thus the shaving gear 4 are thereby pivoted about the axis 10 in a clockwise or in a counterclockwise direction, since the rectilinear movement of the spindle nut 35 in the direction of the arrow R is converted into the swivelling movement $\phi$ of the rocking device 25 by the coupling member 40 and the arcuate guide 24 which is illustrated in a simplified manner in FIG. 4.

The axis 39 does not, as shown in the figures, need to extend horizontally. That is, the axis 39 may also have any other at least approximately tangential orientation relative to the arcuate guide 24, if this is desired for constructional reasons. Moreover, other types of construction of the adjusting device 100 are also possible. Thus it is possible to use in place of the U-shaped coupling member 40 a sleeve-shaped coupling member which surrounds the spindle nut 36, or two coupling rods which are directed parallel to one another on opposite sides of the spindle nut.

Figure 5:
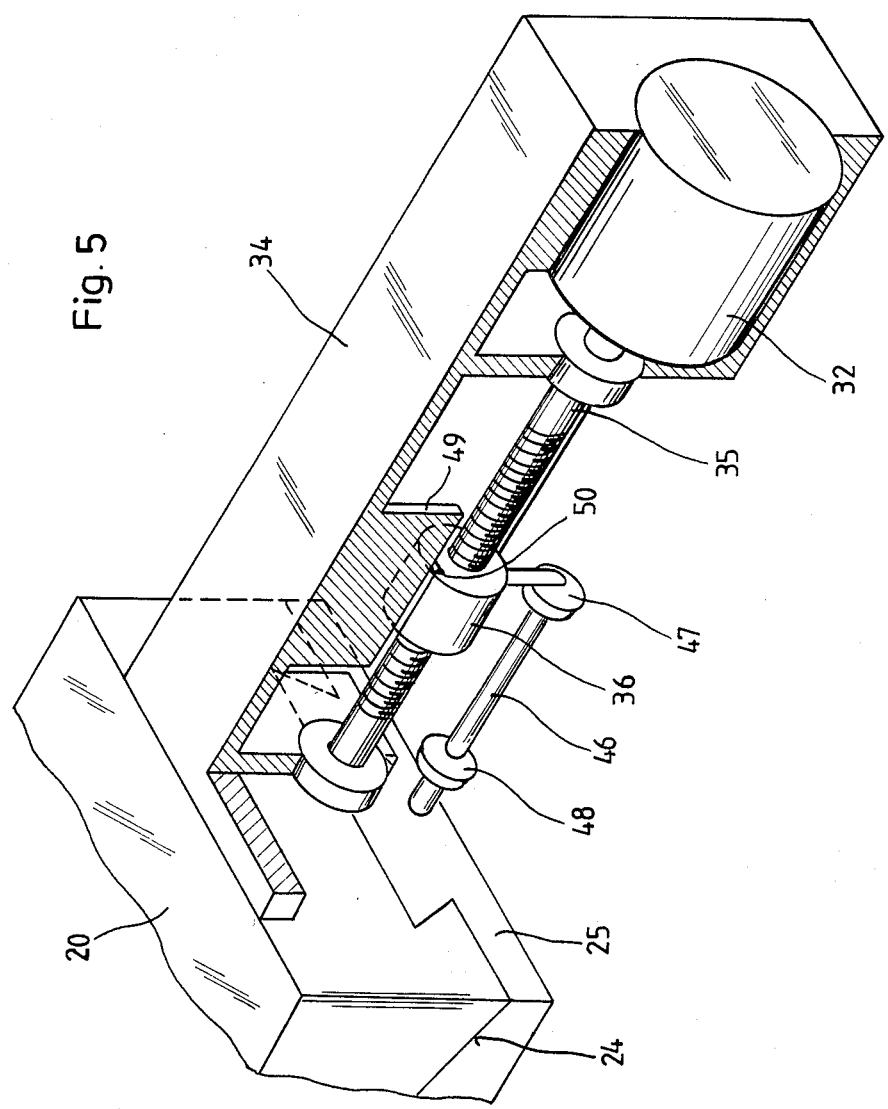
FIG. 5 illustrates through a perspective illustration a different example of a pivot drive.

A further variation is illustrated in FIG. 5, wherein a single coupling member, namely, a coupling rod 46 is used. The coupling rod 46 is hingedly connected to the spindle nut 36 and the rocking device 25 through clearance-free adjustable ball-and-socket joints 47,48. The term "clearance-free" is intended to mean that the rocking device 25 cannot move relative to the arcuate guide 24 unless the spindle nut 36 is moved along the length of the spindle 35. A bar 49 is, in addition in this case, mounted on the arm 34, which bar extends clearance-free into a groove 50 of the spindle nut 36 and secures same against rotation on the spindle 35.

With the above-described machine, it is possible to produce according to the same method also conical and conical-crowned tooth flanks. In both cases, a movement of the tool simultaneously in the R and in the Z direction is necessary. For conical-crowned teeth, this combined or compound movement is further superposed onto the swivelling movement of the tool.

The design of the inventive machine is not to be limited to the described and illustrated example. For example, the tool and the workpiece can also be arranged side-by-side with horizontal or vertical axes. Also the drive mechanisms for the various movements are not to be limited to the described and illustrated embodiments and arrangements.

In machines for other precision working methods, in which only a feed in the direction of the workpiece axis 31 is necessary, the rotary clamping mechanism 19 and/or the rotary clamping mechanism 26 can be deleted. The feed carriage 20 is then guided directly in the vertically elevatable carriage 16 and the tool head 27 is mounted directly on the rocking device 25.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a method for precision working of tooth flanks on a toothed workpiece rotatably supported in a machine frame, and wherein a tool is mounted on a rocking support which in turn is mounted on a feed carriage and said feed carriage is mounted on a plunger carriage, said rocking support effecting a support of said tool so that the axis of rotation thereof is tiltable in a plane and about an axis perpendicular to said plane so that said tool is supported for:
   a feed movement with said feed carriage back and forth across the width of a tooth on said workpiece;
   a plunge movement with said plunger carriage perpendicularly with respect to said workpiece axis; and
   a tilting movement on said rocking support to vary the position of said axis of rotation of said tool about said axis which extends perpendicularly with respect to said plane;
   wherein the improvement comprises a free selecting of a position for each of said plunge carriage and said tool relative to said rocking support and thence the angle of tilt of said axis of rotation of said tool that provides the desired tooth surface characteristic at plural specific locations on a tooth of said workpiece for every position of said tool across the width of said tooth on said workpiece and then sequentially advancing said feed carriage and thence said tool through said plural specific locations on a tooth of said workpiece while independently and automatically varying the position of said plunge carriage and said tool relative to said rocking support.

2. The method according to claim 1, wherein said axis which extends perpendicularly with respect to said plane extends at least approximately through a plane of rotation of said tool which is located at a midpoint of the tilting movement of said axis of rotation of said tool.

3. A machine for precision working of tooth flanks on a toothed workpiece rotatably supported in a machine frame, comprising:
   frame means;
   plunge carriage means mounted on said frame means and drive means for moving said plunge carriage means toward and away from a workpiece along a direction perpendicular to an axis of rotation of said workpiece;
   adjusting carriage means and rotary clamping means for pivotally suspending said adjusting carriage means from said plunge carriage means and for movement about a first axis, said adjusting carriage means including a guide carrier suspended from said rotary clamping means, a feed carriage movably mounted on said guide carrier, a rocking support movably mounted on said feed carriage and a tool rotatably mounted on said rocking support, said rocking support including means for effecting a tilting of an axis of rotation of said tool in a plane and about an axis perpendicular to said plane, the movement of said feed carriage effecting a movement of said tool across the width of said workpiece;
   control means for effecting a smooth and continuous varying of the position of said tool relative to said rocking support and thence the tilting of said axis of rotation of said tool in said plane about said axis perpendicular to said plane and for independently, smoothly and continuously varying the position of said plunge carriage means and said tool relative to said workpiece, all in response to the position of said tool along the width of said workpiece determined by the position of said feed carriage;
   whereby a smooth and continuously varying crowned surface is produced on said teeth of said workpiece.

4. The machine according to claim 3, wherein said axis perpendicular to said plane extends at least approximately through a plane of rotation of said tool which is located at a midpoint of the tilting movement of said axis of rotation of said tool.

5. The machine according to claim 4, wherein said rocking support has a tool head mounted thereon which is rotatable about an axis of rotation that is perpendicular to said axis of rotation of said tool, and wherein said feed carriage is mounted on said plunge carriage and includes rotatably adjustable means for supporting said feed carriage for rotatable movement about an axis which extends perpendicularly with respect to said axis of rotation of said tool and with respect to said axis of said workpiece and which is in alignment with said axis of rotation of said tool head.

6. The machine according to claim 3, wherein for effecting a movement of said rocking support on said feed carriage there is provided an adjusting device which moves rectilinearly along an axis, which device is connected to said rocking support through at least one coupling member, wherein said at least one coupling member is hingedly connected at one end to a rectilinearly adjustable member of said adjusting device and at the other end to said rocking support.

7. The machine according to claim 6, wherein said adjusting device is formed by a threaded spindle having a spindle nut threadedly engaged therewith, which spindle is driven for rotation and is supported on said feed carriage, and said at least one coupling member is hingedly connected to said spindle nut.

8. The machine according to claim 6 or 7, wherein said at least one coupling member is connected to both said rectilinearly adjustable member of said adjusting device and also to said rocking support through clearance-free adjustable joints, the axes of which extend parallel with respect to said axis perpendicular to said plane.

9. The machine according to claim 6 or 7, wherein said at least one coupling member is a coupling rod, which is connected to both said rectilinearly adjustable member of said adjusting mechanism and also to said rocking support through clearance-free adjustable ball-and-socket joints.

10. The machine according to claim 6, wherein the axis defined by the movement of said rectilinearly adjustable member is directed at least approximately tangentially with respect to a circularly shaped guide for said rocking support and said at least one coupling member lies in the normal position parallel with respect to said axis.

11. The machine according to claim 3, wherein said control means includes first drive means for driving said plunge carriage means toward and away from said workpiece, second drive means for driving said feed carriage and thence said tool across said width of said workpiece, and third drive means for driving said rocking support relative to said feed carriage to effect said tilting of said axis of rotation of said tool, said control means including means selectively activating said first and third drive means in response to a position of said feed carriage along the width of said workpiece driven by said second drive means.

* * * * *